United States Patent [19]
Detweiler

[11] Patent Number: 6,043,874
[45] Date of Patent: Mar. 28, 2000

[54] SYSTEM AND METHOD FOR CALIBRATING A LASER TRANSMITTER

[75] Inventor: Philip Lynn Detweiler, Tipp City, Ohio

[73] Assignee: Spectra Precision, Inc., Dayton, Ohio

[21] Appl. No.: 09/058,461

[22] Filed: Apr. 10, 1998

[51] Int. Cl.[7] .................................................. G01B 11/26
[52] U.S. Cl. ................................ 356/139.03; 356/141.1; 356/139.1
[58] Field of Search ............................... 356/375, 139.1, 356/141.1, 139.03, 152.1; 33/DIG. 1, 291

[56] References Cited

U.S. PATENT DOCUMENTS

| | | | |
|---|---|---|---|
| 4,035,084 | 7/1977 | Ramsay | 356/152 |
| 5,137,354 | 8/1992 | De Vos et al. | 356/152 |
| 5,589,939 | 12/1996 | Kitajima | 356/375 |
| 5,852,493 | 12/1998 | Monnin | 356/141.1 |

*Primary Examiner*—Frank G. Font
*Assistant Examiner*—Zandra Smith
*Attorney, Agent, or Firm*—Killworth, Gottman, Hagan & Schaeff, LLP

[57] ABSTRACT

A system and method for checking and calibrating, if necessary, the orientation of a rotating laser beam as projected by a laser transmitter is provided. The laser transmitter is initially adjusted so that the rotating laser beam defines a plane which will be substantially horizontal if the transmitter is properly calibrated. A retroreflective target is positioned a predetermined distance from the transmitter. A known point on the transmitter is aligned in the direction of the retroreflective target. The laser beam is reflected from the retroreflective target back to the laser transmitter. A photodetecting system within the laser transmitter generates a signal representative of the position of the laser beam on the target. The laser transmitter is then rotated about a reference axis until the position of the laser beam on the target is determined with respect to each of the remaining coordinate axes. A processor is programmed to generate a calibration signal in response to the signals from the photodetecting system. The calibration signal may be used to indicate that the laser transmitter needs to be calibrated, or to provide an indication of how to calibrate the laser transmitter. Alternatively, the calibration signal may be used to calibrate the laser transmitter automatically.

66 Claims, 8 Drawing Sheets

SYSTEM AND METHOD FOR CALIBRATING A LASER TRANSMITTER

BACKGROUND OF THE INVENTION

The present invention relates in general to a laser transmitter, and, more particularly, to a system and method for checking and calibrating, if necessary, the orientation of a laser beam defining a plane through which the laser beam is rotated.

Laser light systems have been employed in numerous surveying and construction applications. In one type of system, a laser light transmitting device provides a rotating laser beam which establishes a reference plane. Typically, the rotating laser beam is used to provide a continuous plane of light that creates either a constant horizontal bench mark of elevation or a selected plane over an entire work area. The laser light is either detected by the naked eye or by one or more laser beam detectors, placed at considerable distances from the transmitting device. Various construction tasks may be performed based on the visual perception of the laser light. Alternatively, detectors may be used to intercept the rotating laser beam and determine a proper elevation and grade at selected points throughout the work area.

In one type of laser light transmitting device, the plane of light is produced by projecting the beam generally upward and then deflecting the beam ninety degrees with a pentaprism or penta-mirror assembly. The pentaprism assembly is rotated about a vertical axis, thus rotating the beam and defining the reference plane. The laser light transmitting device is typically calibrated at the time that it is assembled so that the laser beam defines a substantially horizontal plane of light when the transmitting device is properly setup. However, the transmitting device may become miscalibrated due to environmental conditions or rough handling. The laser light transmitting device therefore must be repeatedly checked to ensure that it is still properly calibrated.

One prior art method for checking the calibration of a laser transmitting device involves positioning the laser transmitting device so that it is substantially level. The transmitting device may be leveled manually using leveling vials or automatically using any of a variety of techniques known in the art. Once level, the laser transmitting device is activated so that the laser beam defines a plane which will be substantially horizontal if the transmitting device is properly calibrated.

The laser transmitting device is then aligned with a target which is positioned an approximate set distance from the transmitting device, for example 200 feet. The transmitting device may be aligned by aiming a known point on the device in the direction of the target. The known point is typically aligned with a set axis in the transmitting device, i.e., along the X or Y leveling axes. The position of the laser beam on the target is noted. The transmitting device is rotated through the remaining three coordinate axes with the position of the laser beam on the target being noted for each axis. The position of the laser light on the target for each of the four coordinate axes will be substantially the same if the transmitting device is properly calibrated. Any deviation signifies that the transmitting device is misaligned and calibration is needed.

This method is time consuming and labor intensive as it requires an operator to walk back and forth between the transmitting device and the target for each measurement. Further, the operator must make the measurements manually, calculate the deviation and determine the required adjustments. As a result, field calibrations are probably not performed as often as necessary.

Accordingly, there is a need for improved system for checking and calibrating a laser transmitting device. Preferably, such a system would be automatic and easy to operate requiring little or no intervention on the part of the operator.

SUMMARY OF THE INVENTION

The present invention meets this need by providing a system and method for checking and calibrating, if necessary, the orientation of a rotating laser beam as projected by a laser transmitter. The laser transmitter is initially adjusted so that the rotating laser beam defines a plane which will be substantially horizontal if the transmitter is properly calibrated. A retroreflective target is positioned a predetermined distance from the transmitter. A known point on the transmitter is aligned in the direction of the retroreflective target. The laser beam is reflected from the retroreflective target back to the laser transmitter. A photodetecting system within the laser transmitter generates a signal representative of the position of the laser beam on the target. The laser transmitter is then rotated about a reference axis until the position of the laser beam on the target is determined with respect to each of the remaining coordinate axes. A processor is programmed to generate a calibration signal in response to the signals from the photodetecting system. The calibration signal may be used to indicate that the laser transmitter needs to be calibrated, or to provide an indication of how to calibrate the laser transmitter. Alternatively, the calibration signal may be used to calibrate the laser transmitter automatically.

According to a first aspect of the present invention, a method for checking and calibrating, if necessary, the orientation of a rotating laser beam is provided. The laser beam is projected from a laser source such that it rotates along a rotational arc defined about a central rotational axis and sweeps across a target. The laser source is rotated about a reference axis with the laser source being positioned in a plurality of angular positions about the reference axis. A reflected laser beam is detected from the target with the laser source in each of the plurality of angular positions. A plurality of reference signals representative of the reflected laser beam from the target with the laser source positioned in each of the plurality of angular positions are generated with each of the plurality of reference signals corresponding to a position of the reflected laser beam on the target. A calibration signal is generated in response to the plurality of reference signals.

The step of generating a calibration signal in response to the plurality of reference signals may comprise the step of comparing a first reference signal corresponding to the position of the reflected laser beam on the target with the laser source positioned in a first angular position with a second reference signal corresponding to the position of the reflected laser beam on the target with the laser source positioned in a second angular position. Preferably, the calibration signal is zero when the position of the reflected laser beam on the target with the laser source positioned in the first angular position is substantially the same as the position of the reflected laser beam on the target with the laser source positioned in the second angular position. The plurality of angular positions may be offset from each other by approximately 45 degrees, 90 degrees or 180 degrees.

The method may further comprise indicating that the rotating laser beam needs to be calibrated based on the calibration signal. The method may further comprise indicating a direction in which to adjust a position of the rotating laser beam based on the calibration signal. The method may further comprise adjusting a position of the rotating laser beam based on the calibration signal. The method may further comprise adjusting the output of a leveling sensor based on the calibration signal. Preferably, the leveling sensor comprises an electrolytic leveling vial.

The target may comprise a first reflective section and a second reflective section with a non-reflective section positioned therebetween. Preferably, the at least one non-reflective section includes a first portion which slopes across the first and second reflective sections. The target may also comprise a first target region in which a first dimension of the first reflective region is greater than a second dimension of the second reflective region, a second target region in which the first dimension decreases proportionally with an increase of the second dimension, and a third target region in which the first dimension is less than the second dimension with the first dimension being substantially equal, to the second dimension substantially in a center of the second target region.

Preferably, the step of projecting the laser beam from a laser source such that it rotates along a rotational arc defined about a central rotational axis and sweeps across a target may comprise positioning the laser source such that the laser beam sweeps across the second target region of the target. The step of generating a calibration signal in response to the plurality of reference signals may comprise determining a deviation between the position of the reflected laser beam in the second target region of the target with the laser source positioned in a first angular position and the position of the reflected laser beam in the second target region on the target with the laser source positioned in a second angular position.

The step of projecting the laser beam from a laser source such that it rotates along a rotational arc defined about a central rotational axis and sweeps across a target may comprise adjusting the laser source to a predetermined calibration position with the predetermined calibration position corresponding to a position of the laser source in which the plane defined by the rotating laser beam is substantially horizontal. Preferably, the calibration signal corresponds to a difference between the plane defined by the rotating laser beam and a substantially horizontal plane.

According to another aspect of the present invention, a laser transmitter is provided comprising a photodetecting system receiving a reflected laser beam and generating a reference signal representative of the reflected laser beam. An optical system is arranged to generate a laser beam from a plurality of angular positions about a reference axis and to direct the reflected laser beam to the photodetecting system with the optical system in each of the plurality of angular positions. The photodetecting system generates one of a plurality of reference signals corresponding to a position of the reflected laser beam with the optical system in each of the plurality of angular positions. The optical system projects the laser beam radially along a rotational arc defined about a central rotational axis thereby defining a plane through which the laser beam is projected. A processor adapted to receive the plurality of reference signals and programmed to generate a calibration signal in response to the plurality of reference signals is also provided.

The processor may be further programmed to compare a first reference signal corresponding to the position of the reflected laser beam with the laser optical system positioned in a first angular position with a second reference signal corresponding to the position of the reflected laser beam with the laser optical system positioned in a second angular position. Preferably, the calibration signal is zero when the position of the reflected laser beam with the optical system positioned in the first angular position is substantially the same as the position of the reflected laser beam with the optical system positioned in the second angular position. The plurality of angular positions may be offset from each other by approximately 45 degrees, 90 degrees or 180 degrees.

The laser transmitter may further comprise an indicator device providing an indication that the optical system needs to be calibrated in response to the calibration signal from the processor. Preferably, the indicator device includes a photoelectric device providing a visual indication that the optical system needs to be calibrated in response to the calibration signal from the processor. Preferably, the photoelectric device comprises a light emitting diode.

The optical system may comprise an adjustment device for adjusting an angular orientation of the laser beam with respect to a first axis and with respect to a second axis. The laser transmitter may further comprise an indicator device providing an indication for adjusting the adjustment device in response to the calibration signal from the processor. The indicator device may comprise a photoelectric system providing a visual indication for adjusting the adjustment device in response to the calibration signal from the processor. The photoelectric system may comprise a first photoelectric device and a second photoelectric device providing a first visual indication for adjusting the angular orientation of the laser beam with respect to the first axis and a third photoelectric device and a fourth photoelectric device providing a second visual indication for adjusting the angular orientation of the laser beam with respect to the second axis. Preferably, each of the first, second, third and fourth photoelectric devices comprise a light emitting diode. Alternatively, the photoelectric system may comprise a display device, such as a liquid crystal display.

The adjustment device may comprise a first motor for adjusting the angular position of the laser beam with respect to the first axis and a second motor for adjusting the angular position of the laser beam with respect to the second axis. Preferably, the processor is further programmed to control the first and second motors in response to the calibration system.

The optical system may comprise a first level sensor and a second level sensor with the first level sensor generating a first level signal representative of an angular orientation of the optical system with respect to a first axis and the second level sensor generating a second level signal representative of an angular orientation of the optical system with respect to a second axis. The processor may then be further programmed to control the first and second level signals in response to the calibration signal. Preferably, the first and second level sensors each comprise an electrolytic leveling vial.

The optical system may further comprise a leveling device for adjusting the angular orientation of the optical system with respect to the first axis and with respect to the second axis with the processor being further programmed to control the leveling device in response to the first and second level signals. The optical system may comprise a rotating device for adjusting the angular position of the optical system with respect to the reference axis with the processor being further programmed to control the rotating device so as to position the optical system in each of the plurality of angular positions.

According to yet another aspect of the present invention, a laser transmitting system is provided comprising a target, a photodetecting system, an optical system and a processor. The photodetecting system receives a reflected laser beam from the target and generates a reference signal having a waveform representative of the reflected laser beam. The optical system is arranged to generate a laser beam from a plurality of angular positions about a reference axis and to direct the reflected laser beam from the target to the photodetecting system with the optical system in each of the plurality of angular positions. The photodetecting system generates one of a plurality of reference signals corresponding to a position of the reflected laser beam with the optical system in each of the plurality of angular positions. The optical system projects the laser beam radially along a rotational arc defined about a central rotational axis thereby defining a plane through which the laser beam is projected. The processor is adapted to receive the plurality of reference signals and programmed to generate a calibration signal in response to the plurality of reference signals.

The processor may be further programmed to compare a first reference signal corresponding to the position of the reflected laser beam on the target with the optical system positioned in a first angular position with a second reference signal corresponding to the position of the reflected laser beam on the target with the optical system positioned in a second angular position. Preferably, the calibration signal is zero when the position of the reflected laser beam with the optical system positioned in the first angular position is substantially the same as the position of the reflected laser beam with the optical system positioned in the second angular position. The plurality of angular positions may be offset from each other by approximately 45 degrees, 90 degrees or 180 degrees.

The laser transmitting system may further comprise an indicator device providing an indication that the optical system needs to be calibrated in response to the calibration signal from the processor. The indicator device may include a photoelectric device providing a visual indication that the optical system needs to be calibrated in response to the calibration signal from the processor. Preferably, the photoelectric device comprises a light emitting diode.

The optical system may comprise an adjustment device for adjusting an angular orientation of the laser beam with respect to a first axis and with respect to a second axis. The laser transmitting system may further comprise an indicator device providing an indication for adjusting the adjustment device in response to the calibration signal from the processor. The indicator device may comprise a photoelectric system providing a visual indication for adjusting the adjustment device in response to the calibration signal from the processor. The photoelectric system may comprise a first photoelectric device and a second photoelectric device providing a first visual indication for adjusting the angular orientation of the laser beam with respect to the first axis and a third photoelectric device and a fourth photoelectric device providing a second visual indication for adjusting the angular orientation of the laser beam with respect to the second axis. Preferably, each of the first, second, third and fourth photoelectric devices comprise a light emitting diode. Alternatively, the photoelectric system may comprise a display device, such as a liquid crystal display.

The adjustment device may comprise a first motor for adjusting the angular position of the laser beam with respect to the first axis and a second motor for adjusting the angular position of the laser beam with respect to the second axis. Preferably, the processor is further programmed to control the first and second motors in response to the calibration system.

The optical system may comprise a first level sensor and a second level sensor with the first level sensor generating a first level signal representative of an angular orientation of the optical system with respect to a first axis and the second level sensor generating a second level signal representative of an angular orientation of the optical system with respect to a second axis. The processor may be further programmed to control the first and second level signals in response to the calibration signal. Preferably, the first and second level sensors each comprise an electrolytic leveling vial. The optical system may further comprise a leveling device for adjusting the angular orientation of the optical system with respect to the first axis and with respect to the second axis with the processor being further programmed to control the leveling device in response to the first and second level signals.

The optical system may comprise a rotating device for adjusting the angular position of the optical system with respect to the reference axis with the processor being further programmed to control the rotating device so as to position the optical system in each of the plurality of angular positions. The target may comprise a first target region in which a first dimension of the first reflective region is greater than a second dimension of the second reflective region, a second target region in which the first dimension decreases proportionally with an increase of the second dimension, and a third target region in which the first dimension is less than the second dimension with the first dimension being substantially equal to the second dimension substantially in a center of the second target region.

Accordingly, it is an object of the present invention to provide an improved system for checking and calibrating, if necessary, the orientation of a rotating laser beam provided by a laser transmitter. It is another object of the present invention to provide such a system which is inexpensive and easy to operate, requiring little or no intervention on the part of the operator. Other features and advantages of the invention will be apparent from the following description, the accompanying drawings and the appended claims.

DETAILED DESCRIPTION OF THE PREFERRED EMBODIMENTS

Figure 1:
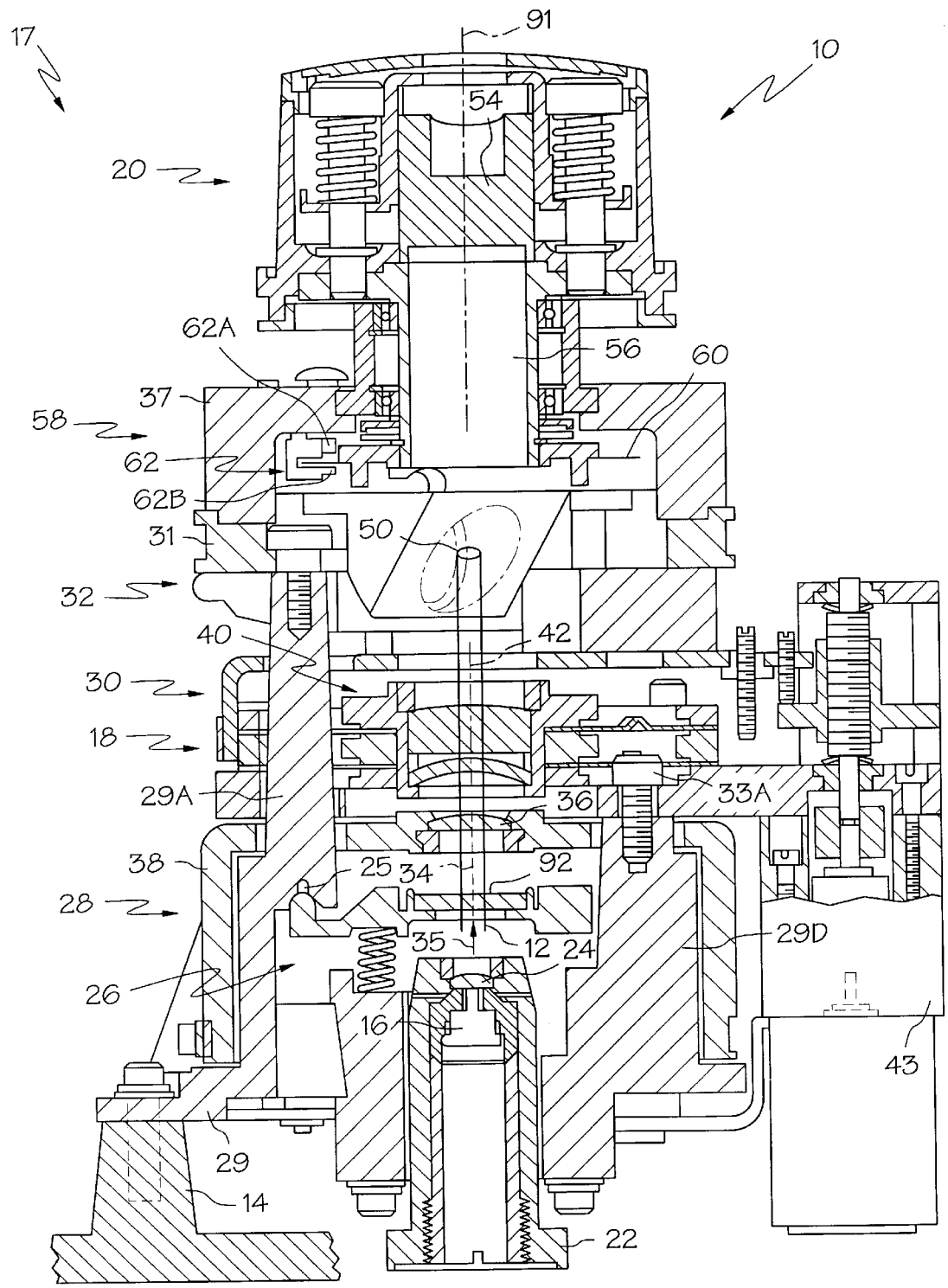
FIG. 1 is a cross-sectional view of a laser transmitter according to one aspect of the present invention.

While the present invention is applicable in general to laser transmitters, it will be described herein with reference to two different laser transmitters. Referring now to FIG. 1, a laser transmitter 10 for transmitting a beam of laser light 12 according to one aspect of the present invention is shown. The laser transmitter 10 includes a housing 14, a light source 16, and an optical system 17. The optical system 17 comprises an optical assembly 18 and an optical projecting device 20. The light source 16 is coupled to an assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

Figure 2:
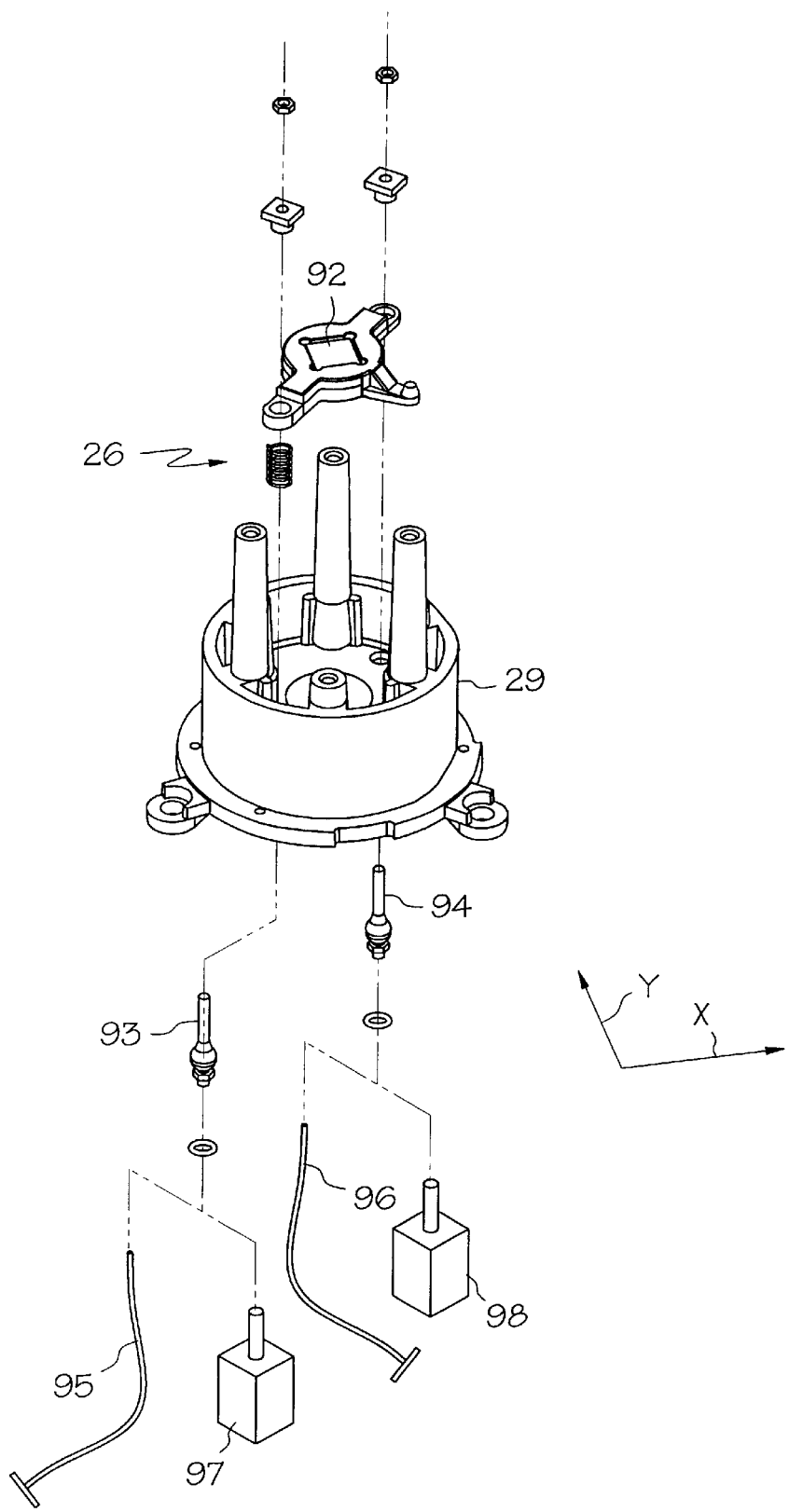
FIG. 2 is an exploded view of an adjustment device shown in FIG. 1.

The optical assembly 18 includes an adjustment device 26, a compensator assembly 28 and a focusing mechanism 30. The compensator assembly 28 includes an optics frame 29, a compensator cup 38 and a wire clamp ring 31. The optics frame 29 is coupled to and supported by the housing 14. The assembly 22 is coupled to the optics frame 29. The adjustment device 26 includes a flat window 92 positioned above the collection lens 24. The flat window 92 is pivotally coupled to the optics frame 29 through a spherical pivot 25. Referring now to FIG. 2, the flat window 92 tilts along a first or X-axis using a first calibration screw 93 and along a second or Y-axis using a second calibration screw 94. The X-axis is preferably substantially orthogonal to the Y-axis and defined as shown in FIG. 2. The position of the flat window 92 with respect to the X-axis and with respect to the Y-axis is finely adjusted by the calibration screws 93, 94 so that the laser beam 12 is projected along substantially vertical axis or projection axis 34. The laser beam 12 will therefore be plumb when the optics frame 29 is positioned along a plane which is substantially parallel with respect to the plane of the ground, i.e. substantially level. A plumb beam of light is light which is projected substantially vertical with respect to the ground. The laser beam 12 is projected along the projection axis 34 by the light source 16 and the collection lens 24 and made plumb through the flat window 26. It should be apparent that the laser beam will be plumb as long as the optics frame 29 is substantially level with respect to the ground.

The adjustment device 26 may include first and second cables 95, 96 for manual adjustment of the first and second calibration screws 93, 94, respectively. Alternatively, the adjustment device 26 may include first and second motors 97, 98 for automatic adjustment of the first and second calibration screws 93, 94, respectively. The first and second cables 95, 96 and the first and second motors 97, 98 may be coupled to the first and second calibration screws 93, 94 using interfacing devices well known in the art.

Figure 3:
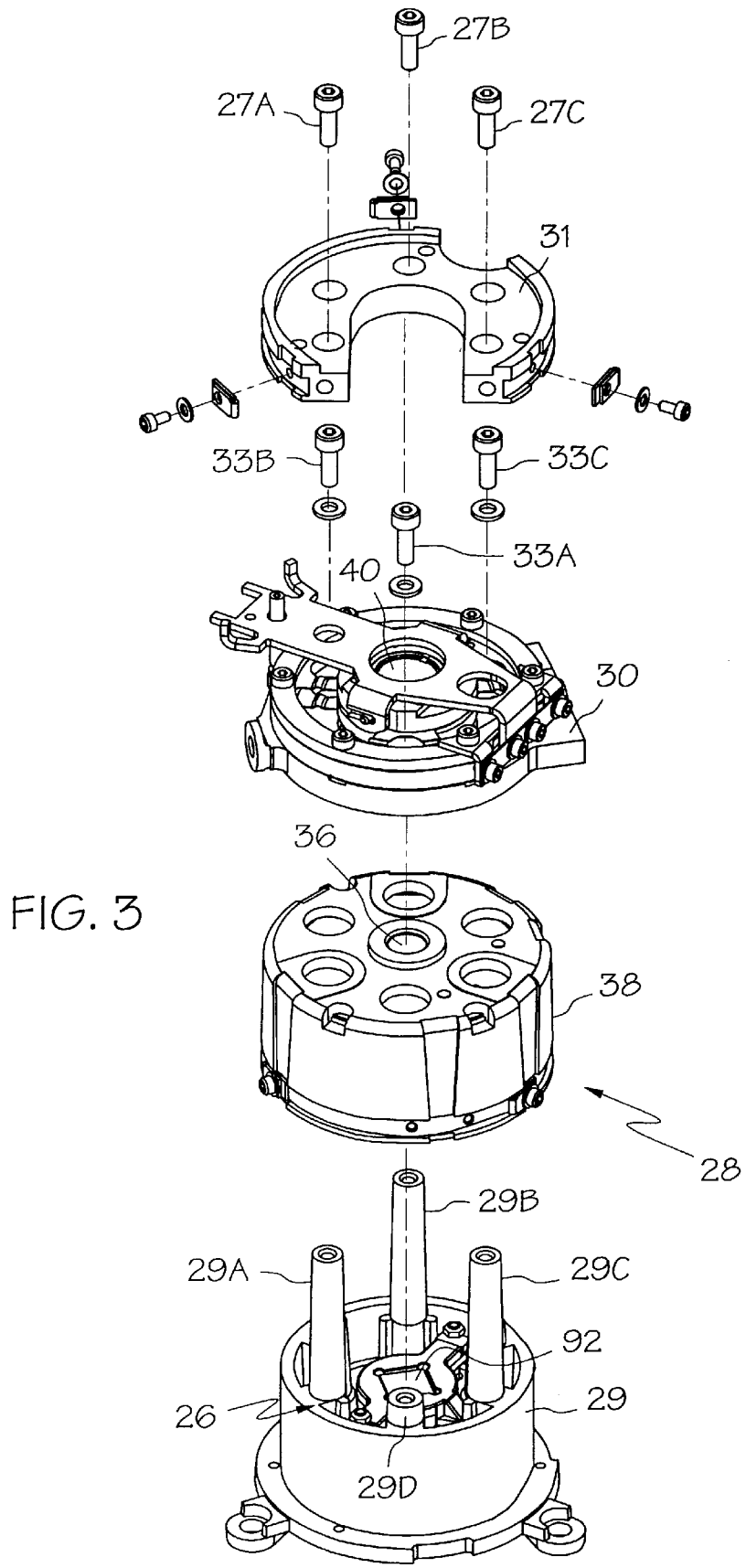
FIG. 3 is an exploded view of a compensator assembly shown in FIG. 1.

The compensator assembly 28 optically adjusts the position of the laser beam 12 so that it is plumb even when the optics frame 29 is not substantially level. As shown in FIG. 3, the compensator assembly 28 includes a compensating lens 36 mounted in the center of the compensator cup 38. The compensator cup 38 is positioned above the flat window 92 and swings freely on three wires (not shown) which are attached to the wire clamp ring 31. The wire clamp ring 31 is coupled to the optics frame 29 through three posts 29A, 29B, 29C by fasteners 27A, 27B, 27C. The compensator cup 38 is free to translate laterally when it is within a certain degree of level. In the illustrated embodiment, the compensator cup 38 is free to translate when it is within 12 minutes of level.

As long as the compensator cup 38 is within 12 minutes of level, the compensating lens 36 may translate along the X and Y axes and optically adjust the position of the laser beam 12 so that it is plumb as it emerges from the compensator cup 38. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 92 and the compensator assembly 28 function to project the laser beam 12 along projection axis 34, either singularly or in tandem. It will be appreciated by those skilled in the art that the present invention may be practiced with or without the compensator assembly 28.

The focusing mechanism 30 is positioned above the compensator cup 38 and coupled to the optics frame 29 through three small posts (only one post 29D shown) by three fasteners 33A, 33B, 33C. The three posts 29A, 29B, 29C of the optics frame 29 pass through the focusing mechanism 30 so that the focusing mechanism 30 does not contact the compensator cup 38. The focusing mechanism 30 includes a focusing lens 40 which is translated along the projection axis 34 to adjust the focus of the laser beam 12. The focusing mechanism 30 is positioned so that the projection axis 34 coincides with an optical axis 42 of the focusing lens 40. A plumb beam of laser light 12 is focused by the focusing mechanism 30 along the optical axis 42. The focusing mechanism 30 includes a focus motor 43 coupled to the focusing lens 40. The focus motor 43 is adapted to change the position of the focusing lens 40, thereby adjusting the focus of the laser beam 12. The focusing mechanism 30 is described in detail in copending application, U.S. Ser. No. 08/834,473 (Attorney Docket No. SPC 301 PA), FOCUSING MECHANISM USING A THIN DIAPHRAGM, filed Apr. 11, 1997, by Hayes, herein incorporated by reference. It will be appreciated by those skilled in the art that another focusing mechanism may be used without departing from the scope of the present invention. It will be further appreciated by those skilled in the art that the present invention may be practiced with or without the focusing mechanism 30.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

Figures 4, 5:
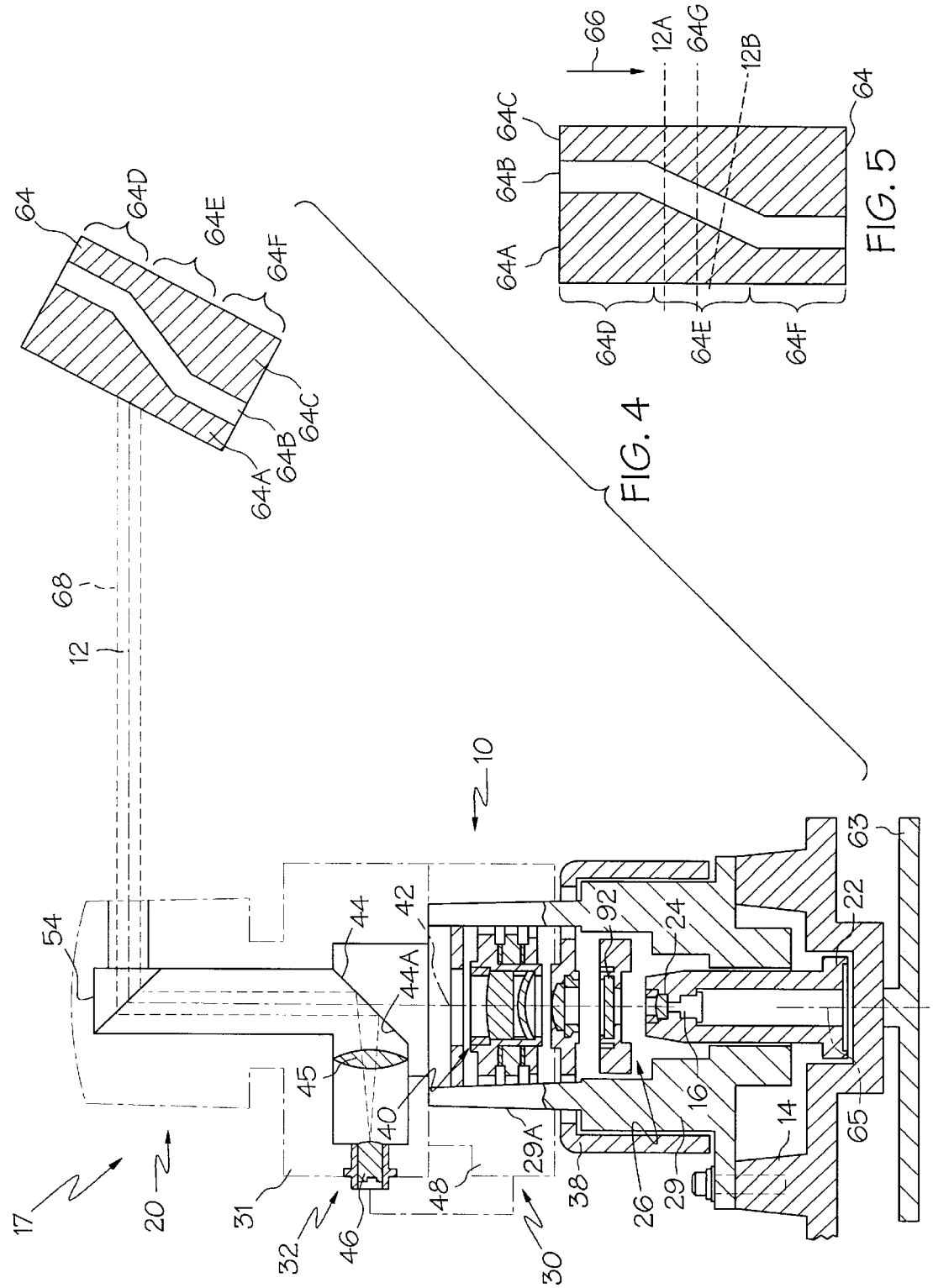
FIG. 4 is a schematic view of the laser transmitter of FIG. 1.
FIG. 5 is a front view of a target according to the present invention.

The laser transmitter 10 includes a photodetecting system 32 coupled to the optics frame 29 and positioned above the focusing mechanism 30. As shown in FIG. 4, the photodetecting system 32 includes a reflector 44, a lens 45, a photodetector 46 and a detector circuit 48. The reflector 44 includes an aperture 50 positioned along optical axis 42; see also FIG. 1. The aperture 50 is sized to pass the laser beam 12. The reflector 44 also includes a reflective surface 44A to reflect returned light to the photodetector 46.

Referring to FIG. 1, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety-degree angle with respect to the direction of the incoming light, within limits, regardless of the precise orientation of the pentaprism 54. Consequently, the incoming light does not have to hit the pentaprism 54 at an exact location in order to be deflected ninety degrees.

The pentaprism 54 is rotated within the spindle 56 by the motor at a speed of approximately 50 rpm to define a substantially horizontal plane of light. The laser beam 12 is rotated along a rotational arc defined about a central rotational axis 91. The central rotational axis 91 corresponds to the center of rotation of the pentaprism 54. The rotational arc is preferably 360 degrees. However, it will be appreciated by those skilled in the art that the laser beam 12 may be dithered back and forth so as to define a rotational arc less than 360 degrees. A speed of 50 rpm is well suited for visible perception of the laser light 12 by the user. However, as will be appreciated by those skilled in the art the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used. While the laser transmitter 10 has been described with the laser light 12 being transmitted upwards, it will be appreciated by those skilled in the art that optical components may be shifted appropriately so that the laser light 12 is transmitted downwards, with the optical projecting device 20 being the lower most component and the light source 16 and assembly 22 being the upper most components. It will be further appreciated by those skilled in the art that the compensator cup 38 may be locked in place with the laser transmitting device 10 positioned on its side so as to project a generally vertical beam of light.

The optical projecting device 20 also includes an optical rotary encoder 58. The optical rotary encoder 58 includes an encoder disc 60 and a read head 62. The encoder disc 60 has graduations around the periphery of the disc which are read by the read head 62. The read head 62 includes an optical source 62A and an optical detector 62B. The encoder disc 60 is positioned between the optical source 62A and the optical detector 62B so that as the encoder disc 60 rotates, the read head 62 generates a rotary signal representative of the position of the encoder disc 60, and hence the pentaprism 54. As is well known in the art, the encoder disc 60 may contain graduations which are spaced in a manner so that each position around the disc is uniquely referenced. Alternatively, in the illustrated embodiment, the encoder disc 60 contains a reference mark graduation (not shown) and a number of equally spaced graduations so that the position around the encoder disc 60 is referenced to the reference mark graduation.

Referring now to FIG. 4, the optical system 17 also includes a rotating device 63. The rotating device 63 is coupled to the housing 14 to effectuate rotation of the laser transmitter 10, and hence, the optical system 17 about a reference axis 65. The optical system 17 may therefore be positioned in a plurality of angular positions about the reference axis 65. The rotating device 63 may be configured so that the laser transmitter 10 may be rotated manually or automatically using a motor or similar device (not shown).

Referring now to FIGS. 4 and 5, a target 64 is placed at a desired location for checking and calibrating, if necessary, the orientation of the rotating laser beam 12 projected by the laser transmitter 10. The target 64 is positioned a predetermined distance from the laser transmitter 10. In the illustrated embodiment, the target 64 is positioned approximately 200 feet from the laser transmitter 10. However, it will be appreciated by those skill in the art that the target 64 may be separated from the laser transmitter 10 by any appropriate distance. According to the illustrated embodiment and as shown in FIG. 5, the target 64 comprises three sections, 64A, 64B, 64C. The target 64 includes a first reflective section 64A, a second reflective section 64C, and a non-reflective section 64B positioned between the first and second reflective sections 64A, 64C. In the illustrated embodiment, the first and second reflective sections 64A, 64C are composed of reflective materials while the non-reflective section 64B is composed of a non-reflective material. It will be appreciated by those skilled in the art that the non-reflective section 64B may be composed of materials which are not completely non-reflective as long as reflective characteristics of such material is different from the reflective characteristics of the material forming the reflective sections 64A, 64C so that the non-reflective section 64B may be distinguished from the reflective sections 64A, 64C.

The target 64 includes a first target region 64D, a second target region 64E and a third target region 64F. The width of the non-reflective section 64B is substantially constant in each of the target regions 64D–64F. In the first target region 64D, a first width or dimension of the first reflective section 64A is greater than a second width or dimension of the second reflective section 64C. Similarly, in the third target region 64F, the second dimension of the second reflective section 64C is greater than the first dimension of the first reflective section 64A. In the second target region 64E, the non-reflective section 64B slopes across the first and second reflective sections 64A, 64C such that in a first direction 66 the first dimension decreases with a proportional increase of the second dimension. In the illustrated embodiment, the first dimension substantially equals the second dimension substantially in the center 64G of the target 64. It will be appreciated by those skilled in the art that the target 64 may comprise more than three total sections. A target having multiple reflective and non-reflective sections may be used for greater accuracy without departing from the scope of the present invention.

It should be apparent that the target 64 should be comprised of alternating reflective and non-reflective sections with at least two reflective sections and at least one non-reflective section positioned therebetween. The orientation of the plane as defined by the rotating laser beam 12 is adjusted by detecting the light reflected from the target 64. The photodetecting system 32 is designed to detect light which is reflected from the reflective sections 64A, 64C of the target 64 such that the first and last sections should be reflective. It will be appreciated by those skilled in the art that if the first and/or last section is non-reflective, such non-reflective sections would be irrelevant for the purposes of the present invention as the photodetecting system 32 would not be able to distinguish the first or last non-reflective section from the surrounding environment. The photodetecting system 32 is only able to detect a non-reflective section if the non-reflective section is surrounded by reflective sections. However, it will be appreciated by those skilled in the art that a non-reflective section in the first and/or last section of the target would help prevent errors associated with interfering reflective surfaces located near the target. In the illustrated embodiment, the target 64 is comprised of a single integral unit including sections 64A, 64B and 64C. However, the target 64 may be comprised of discrete first and third reflective sections 64A and 64C coupled together with an empty space between them representing the non-reflective second section 64B. Further, the target 64 may comprise separate and distinct sections 64A, 64B and 64C which are positioned a set distance from each other, or separate and distinct reflective sections 64A, 64C separated a set distance from each other.

Figure 6:
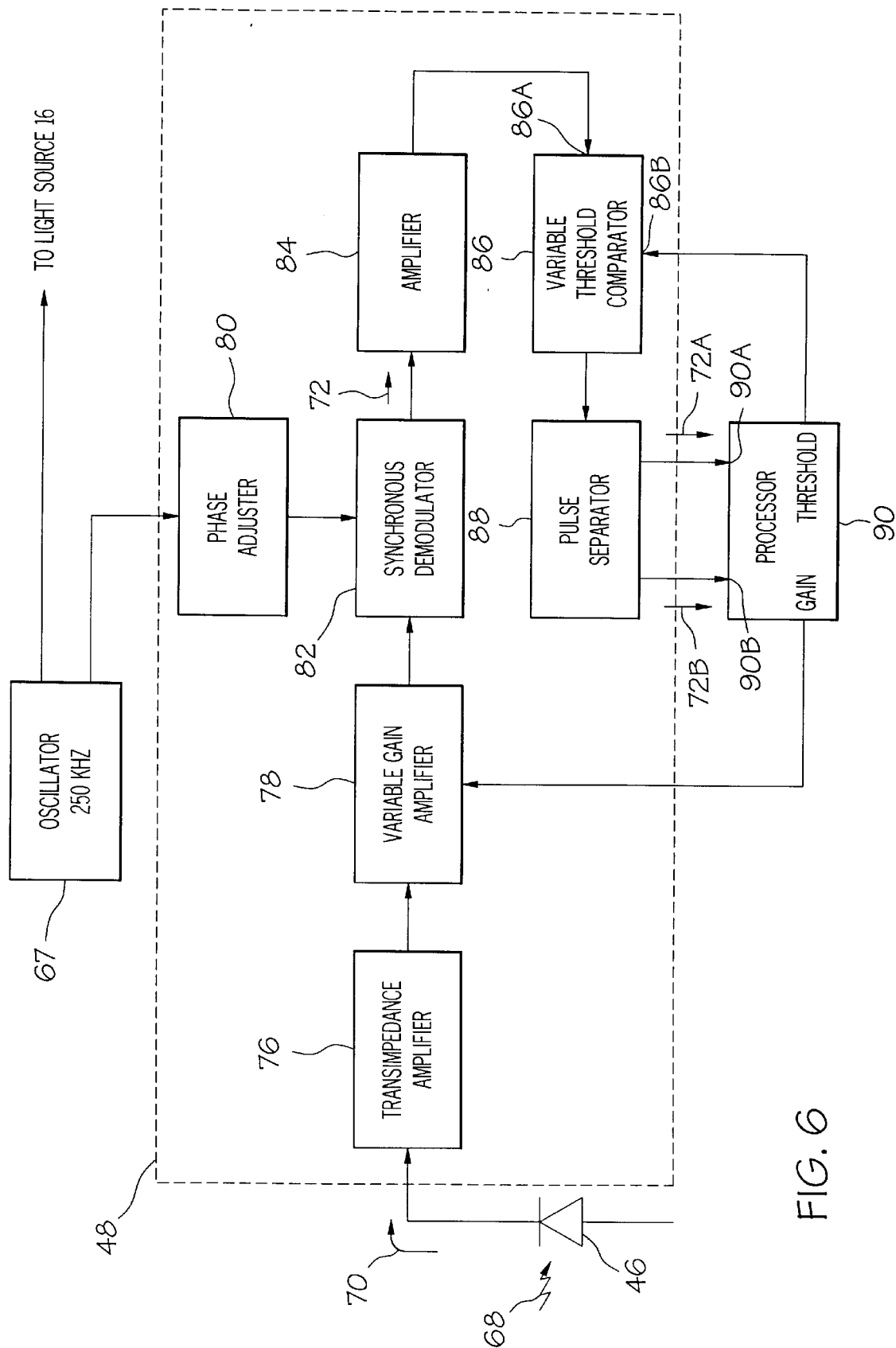
FIG. 6 is a schematic diagram of a detector circuit of the laser transmitter of FIG. 1.

During field calibration in which the orientation of the rotating laser beam 12 is checked and calibrated if necessary, the laser beam 12 is modulated by an oscillator 67 which supplies power to the light source 16, as shown in FIG. 6. The laser beam 12 is modulated to distinguish the laser beam 12 from other light sources, such as any of the numerous other ambient light sources. Preferably, the oscillator 67 generates a 250 KHz carrier oscillation signal. It will be appreciated by those skilled in the art that other frequencies may be used to modulate the laser beam 12. It should be further appreciated by those skilled in the art that the laser beam 12 may be transmitted without any modulation. As shown in FIG. 4, the modulated laser beam 12 is swept across the target 64.

In the illustrated embodiment of FIG. 5, the laser beam 12 is swept across the target 64 generally perpendicular to the first direction 66 as represented by laser beam trace 12A. However, it should be apparent that the laser beam 12 may be swept across the target 64 having orientations other than generally perpendicular to the first direction 66 since the configuration of the target 64 with the sloped non-reflective section 64B produces proportionate changes in the length of time in which the laser beam 12 traverses each section 64A, 64B, and 64C of the target 64. For example, if the laser beam 12 is tilted as represented by laser beam trace 12B, the length of time in which the laser beam 12 traverses the first reflective section 64A increases in the same proportion as the length of time in which the laser beam 12 traverses the second reflective section 64C. As the changes in length of time the laser beam 12 traverses each section 64A, 64B and 64C is directly proportional to orientation of the laser beam 12 across the target 64, the laser beam 12 may be swept across the target 64 with orientations other than generally perpendicular to the first direction without departing from the scope of the present invention.

A reflected beam of laser light 68 is reflected back towards the laser transmitter 10. For clarity and ease of description, the reflected beam of laser light 68 has been given a separate designation from the laser beam 12 even though they are the same beam. The reflected beam of laser light 68 consists of two pulses of light each time the laser light 12 is reflected from the first and second reflective sections 64A, 64C of the target 64. The reflected light 68 is received by the pentaprism 54 and reflected towards the reflector 44. The reflected light 68 is then reflected by the reflective surface 44a of reflector 44 and focused by the lens 45 onto the photodetector 46.

Figure 7A:
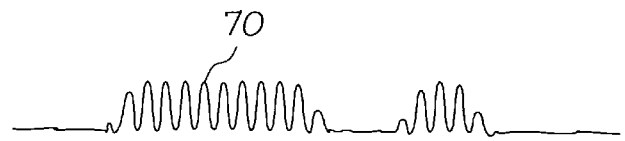
FIG. 7A is a waveform representative of modulated light reflected from a first target region of the target of FIG. 5.
Figure 7B:
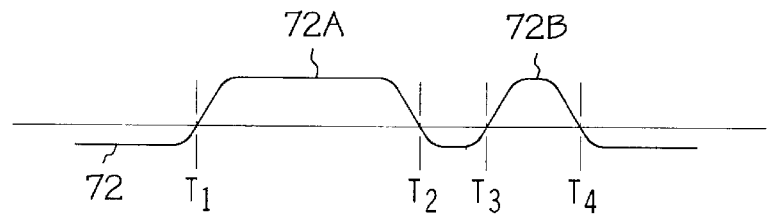
FIG. 7B is a waveform of a data signal portion of the waveform of FIG. 7A.
Figure 8A:
FIG. 8A is a waveform representative of modulated light reflected from a second target region of the target of FIG. 5.
Figure 8B:
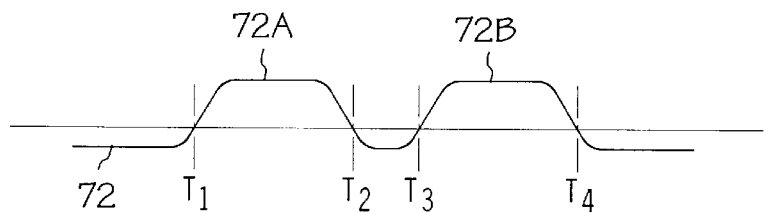
FIG. 8B is a waveform of a data signal portion of the waveform of FIG. 8A.
Figure 9A:
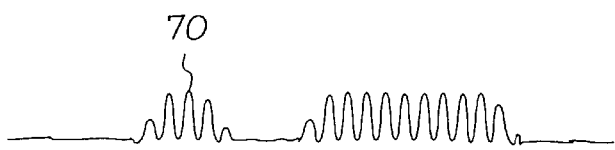
FIG. 9A is a waveform representative of modulated light reflected from a third target region of the target of FIG. 5.

As shown in FIGS. 7A, 8A and 9A, the photodetector 46 generates a reference signal 70 having a waveform representative of the reflected light 68. In the illustrated embodiment, the photodetector 46 is a PIN diode such that the signal 70 is in current form. The waveform comprises two pulses representative of the time periods in which the laser light 12 sweeps across the first and second reflective sections 64A, 64C of the target 64. The signal 70 is basically an amplitude modulated signal with a data signal portion 72 and the 250 KHZ carrier oscillation signal portion 74 (see FIGS. 7B, 8B, 9B and 10). The signal 70 is transmitted to the detector circuit 48 as part of the field calibration routine.

Referring again to FIG. 6, the detector circuit 48 includes a transimpedance amplifier 76, a variable gain amplifier 78, a phase adjuster 80, a synchronous demodulator 82, an amplifier 84, a variable threshold comparator 86 and a pulse separator 88. The photodetector 46 is coupled to the transimpedance amplifier 76. The transimpedance amplifier 76 converts the current form of the signal 70 generated by the photodetector 46 to a voltage form of the signal 70. The voltage form of the signal 70 is transmitted to the variable gain amplifier 78. In the illustrated embodiment, the variable gain amplifier 78 has a low gain mode and a high gain mode. The low gain mode is used when the target 64 is close to the laser transmitter 10 since more light is reflected back. The high gain mode is used when the target 64 is far from the laser transmitter 10 since less light is reflected back. The variable gain helps prevent the detector circuit 48 from saturating when an excessive amount of light is reflected back to the laser transmitter 10. It will be appreciated by those skilled in the art that the transimpedance amplifier 76 could be a variable gain transimpedance amplifier. It will be further appreciated by those skilled in the art that the detector circuit 48 could be prevented from going into saturation by using a conventional clipping circuit.

Figure 9B:
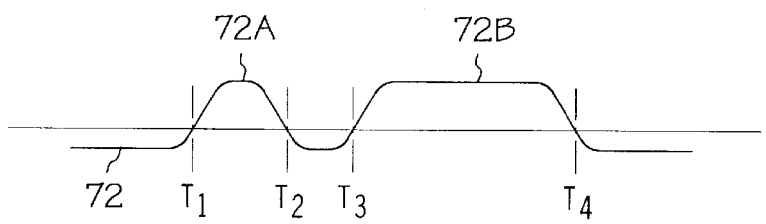
FIG. 9B is a waveform of a data signal portion of the waveform of FIG. 9A.
Figure 10:
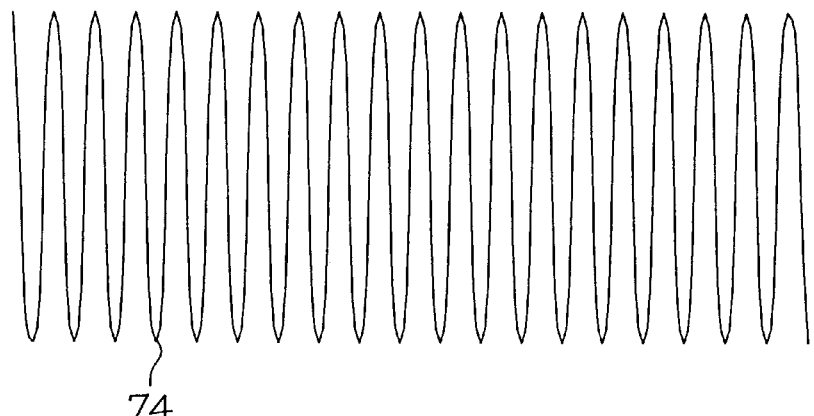
FIG. 10 is a waveform of a carrier oscillation portion of the waveform of FIGS. 7A, 8A and 9A.

The phase adjuster 80 receives the carrier oscillation signal which was used to modulate the laser beam 12. The phase adjuster 80 adjusts the phase of the carrier oscillation signal to match the phase of the signal 70. The adjusted oscillation signal is fed to the synchronous demodulator 82 along with the signal 70 from the variable gain amplifier 78. The synchronous demodulator 82 separates the carrier oscillation signal portion 74 from the data signal portion 72. As shown in FIGS. 7B, 8B and 9B, the data signal portion 72 comprises a first pulse 72A and a second pulse 72B. The synchronous demodulator 82 outputs the data signal portion 72 which is then amplified by the amplifier 84.

The amplified data signal portion 72 is inputted into a first input 86A of the variable threshold comparator 86. A second input 86B of the variable threshold comparator 86 receives a threshold voltage which sets the threshold capability of the variable threshold comparator 86. A threshold voltage is used to filter out background noise that may be detected by the photodetector 46. The variable threshold comparator 86 outputs the portions of the amplified data signal portion 72 which exceed the voltage threshold as established by the second input 86B. As the laser beam 12 is swept across the reflective sections 64A, 64C, the data signal pulses 72A, 72B extracted by the detection circuit 48 should exceed the threshold voltage.

The threshold voltage may be adjusted based on the approximate distance between the target 64 and the laser transmitter 10. A lower threshold voltage may be set when a relatively weak signal is received while a higher threshold voltage may be set when a relatively strong signal is received. A stronger signal will be generated as the target 64 is moved closer to the laser transmitter 10.

The amplified data signal portion 72 outputted from the variable threshold comparator 86 is inputted into the pulse separator 88. The pulse separator 88 separates the two pulses 72A, 72B into separate component pulses, i.e. the first pulse 72A and the second pulse 72B. The first pulse 72A is transmitted to a first timer input 90A of a processor 90 while the second pulse 72B is transmitted to a second timer input 90B of the processor 90. The processor 90 includes an internal clock and an edge detector which establish the time interval in which a transition is made by each pulse 72A, 72B. As shown in FIGS. 7B, 8B and 9B, the first transition is set as $T_1$, the second transition is set as $T_2$, the third transition is set as $T_3$ and the fourth transition is set as $T_4$.

The first time period $TP_1$ ($T_2$–$T_1$), represents the duration of time in which the laser beam 12 sweeps across the first reflective section 64A of the target 64. The second time period or deadband period $TP_2$ ($T_3$–$T_2$), represents the duration of time in which the laser beam 12 sweeps across the non-reflective section 64B of the target 64. The third time period $TP_3$ ($T_4$–$T_3$), represents the duration of time in which the laser beam 12 sweeps across the second reflective section 64C of the target 64. The processor 90 is programmed to analyze the time periods in order to determine the location of the laser beam 12 on the target 64.

The ratio or difference of the first and third time periods $TP_1$ and $TP_3$ vary between two extremes based on the dimensions of the first and second reflective sections 64A, 64C in the first and third regions 64D and 64F. As shown in FIG. 7B, the first time period $TP_1$ is greater than the third time period $TP_3$ by a fixed set amount when the orientation of the rotating laser beam 12 forms a plane which traverses the first target region 64D. Similarly, as shown in FIG. 9B, the first time period $TP_1$ is less than the third time period $TP_3$ by a fixed set amount when the rotating laser beam 12 forms a plane which traverses the third target region 64F. The first and third time periods TP1 and TP3 vary between the set extremes when the rotating laser beam 12 forms a plane which traverses the second target region 64E. The processor 90 therefore may be programmed to determine the position of the rotating laser beam 12 on the target 64 when the rotating laser beam forms a plane which traverses the second target region 64E. As shown in FIG. 8B, the rotating laser beam 12 forms a plane which substantially intersects the center 64G of the target 64 when the pulses 72A and 72B are substantially equal. Accordingly, the ratio of the first time period $TP_1$ to the third time period $TP_3$ will substantially equal one when the rotating laser beam 12 forms a plane which substantially intersects the center 64G.

During field calibration, the laser transmitter 10 and the target 64 are positioned so that the rotating laser beam 12 traverses the second target region 64E. With the rotating laser beam 12 traversing the second target region 64E, the position of the rotating laser beam 12 on the target 64 may be determined by the processor 90 by comparing the relative magnitudes of the first and second time periods $TP_1$ and $TP_3$. It should be apparent that the exact position of the rotating laser beam 12 on the target 64 may only be determined when the rotating laser beam 12 traverses the second target region 64E. If the rotating laser beam 12 traverses the first or third target regions 64D, 64F, the processor 90 will only be able to determine that the rotating laser beam 12 is in one of the regions but not the exact position in the region as the relative distance of the first and second reflective sections 64A, 64C are substantially constant in first and third target regions 64D, 64F.

There are three basic errors that may arise in the laser transmitter 10. The first error is called saddle error in which the laser beam 12 on the pentaprism 54 is not parallel with the axis of rotation of the pentaprism 54. The second error is cone error. Cone error occurs when the reflecting faces of the pentaprism 54 are not offset exactly 45 degrees from each other or when the axis of geometry of the pentaprism 54 is not parallel to the laser beam 12. The third error is calibration error in which the laser beam 12 is not pointing exactly vertical when the laser transmitter 10 is substantially level. Saddle error and cone error arise during assembly of the laser transmitter 10 as a result of the mechanical tolerance in fabricating and positioning components. Calibration error is the main error resulting from misalignments in the optical system 17 due to environment factors, rough handling, and the like. The present invention is directed mainly to compensating for calibration errors. However, the other errors may be considered so as to minimize the overall error resulting from all three errors as described herein.

The laser transmitter 10 may be checked and calibrated, if necessary, as follows. The laser transmitter 10 is positioned using any of a variety of techniques known in the art so that the laser transmitter 10, and hence, the compensator assembly 28, is substantially level. For example, leveling vials (not shown) may be coupled to the housing 14 and aligned with respect to the X and Y axes. The laser transmitter 10 is then adjusted until the leveling vials indicate that the laser transmitter 10 is substantially level. Another leveling system is described in copending application, U.S. Ser. No. 08/834,472, POSITION LEVELING SENSOR FOR A LASER TRANSMITTER, filed Apr. 11, 1997, by Jackson et al., herein incorporated by reference. If the laser transmitter 10 is properly calibrated, the rotating laser beam 12 should define a plane which is substantially level or horizontal.

The target 64 is positioned the desired predetermined distance from the laser transmitter 10. The laser transmitter 10 and the target 64 are positioned so that the rotating laser beam 12 traverses the second target region 64E. It should be apparent that the distance between the laser transmitter 10 and the target 64 may be determined based on the total duration of the three time periods since the total duration is inversely proportional to the distance, i.e. shorter for longer distances and longer for shorter distances. A known point on the laser transmitter 10 is aligned with the target 64 by aiming the known point in the direction of the target 64. The known point is preferably configured so that it forms a line substantially parallel to one of the X and Y axes of the adjustment device 26. In the illustrated embodiment, the known point is positioned so that it forms a line substantially parallel to the X-axis. It will be appreciated by those skilled in the art that the known point on the laser transmitter 10 may also be positioned so that it forms a line that is at an angle with respect to the X and Y axes. The laser transmitter 10 may be said to be in a first angular position about the reference axis 65 once the known point is aligned with the target 64.

Once the laser transmitter 10 is properly positioned and aligned with the target 64, the processor 90 determines the position of the rotating laser beam 12 on the target 64 based on the reference signal 70 generated by the photodetecting system 32. The laser transmitter 10, and hence, the optical system 17, is rotated about the reference axis 65 using the rotating device 63 so as to determine the position of the rotating laser beam 12 on the target 64 from a plurality of different angular positions. The laser transmitter 10 is rotated at least 180 degrees from the first angular position to a second angular position so as to make at least two measurements for checking the calibration of the laser transmitter 10 with respect to the X-axis.

As configured, the laser transmitter 10 may be rotated 90 degrees between measurements so as to check the calibration of the laser transmitter 10 along both X and Y axes. It should be apparent that at least two measurements, preferably 180 degrees apart, are required for each axis. Accordingly, the laser transmitter 10 will have to be positioned at four angular positions, i.e., 0 degrees, 90 degrees, 180 degrees and 270 degrees, so as to check the calibration of the laser transmitter 10 along both of the X and Y axes. The accuracy of the calibration check may be improved by making a number of measurements. For example, eight measurements may be taken with the laser transmitter 10 rotated 45 degrees from one angular position to another. The orientation of the rotating laser beam 12 may therefore be determined along additional azimuth angles and not just on the axes. By measuring the deviation along additional azimuth angles, a continuous function to represent the measured error could be derived using the first three terms of a Fourier series. The constant term would represent the cone error, the fundamental term would represent calibration error and the second harmonic would represent saddle error. The processor 90 could be programmed so that the overall error at all points around the laser transmitter 10 is reduced and not just with respect to the X and Y axes. It will be appreciated by those skilled in the art that other angular increments may be used. It will be further appreciated by those skilled in the art that the position of the rotating laser beam 12 may be averaged over several passes, i.e. rotations of the pentaprism 54, to reduce the errors due to random noise, mechanical vibrations, and the like.

The processor 90 may be programmed to control the motor on the rotating device 63 so that the laser transmitter 10 is rotated from one angular position to another automatically. Alternatively, the processor 90 may be programmed to provide an indication when to manually rotate the laser transmitter 10, the direction and the desired number of degrees.

The processor 90 is programmed to generate a calibration signal in response to the reference signals 70 generated with the laser transmitter 10 in each of the plurality of angular positions. For each axis, the processor 90 is programmed to compare corresponding reference signals so as to determine any differences or deviations in the location of the rotating laser beam 12 on the target 64. The processor 90 is actually determining the angular error of the rotating laser beam 12 as a function of azimuth angle. For example, the position of the rotating laser beam 12 on the target 64 with the laser transmitter 12 positioned at 0 degrees and 180 degrees should be substantially equal if the laser transmitter 10 is properly calibrated.

Any deviation in the position of the rotating laser beam 12 is an angular error which may be compensated for by adjusting the adjustment device 26 appropriately. The processor 90 therefore compares appropriate reference signals to determine a deviation, if any, in the position of the rotating laser beam 12 on the target 64 with the laser transmitter 10 in corresponding angular positions. If the position of the rotating laser beam 12 on the target 64 is substantially the same with the laser transmitter 10 in each of the plurality of angular positions, the calibration signal generated by the processor 90 will be zero signifying that the laser transmitter 10 is properly calibrated. Otherwise, the processor 90 will generate an appropriate calibration signal for appropriate action.

Figure 11:
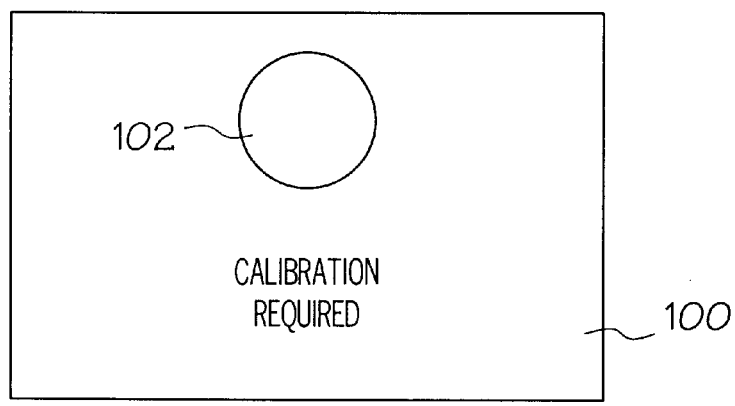
FIG. 11 illustrates an indicator device according to another aspect of the present invention.

As shown in FIG. 11, the laser transmitter 10 may include an indicator device 100. In one aspect of the present invention, the indicator device 100 may be configured to provide an indication that the optical system 17 needs to be calibrated based on the calibration signal. In the illustrated embodiment, the indicator device 100 includes a photoelectric device 102, such as a light emitting diode, so as to provide a visual indication that the optical system 17 needs to be calibrated. It will be appreciated by those skilled in the art that the indicator device 100 may be configured to provide an audible signal, either alone or in combination with the photoelectric device 102, to indicate that the optical system 17 needs to be calibrated.

Figure 12:
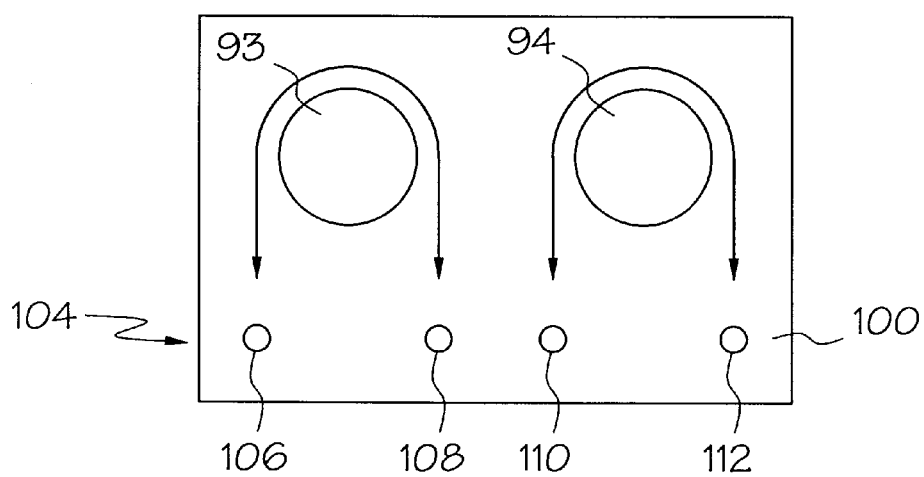
FIG. 12 illustrates another indicator device according to yet another aspect of the present invention.

In another aspect of the present invention, the indicator device 100 may be configured to provide an indication for the manual adjustment of the adjustment device 26 based on the calibration signal. In the illustrated embodiment shown in FIG. 12, the indicator device 100 includes a photoelectric system 104. The photoelectric system 104 may comprise a first photoelectric device 106, a second photoelectric device 108, a third photoelectric device 110 and a fourth photoelectric device 112. Preferably, the photoelectric device 106, 108, 110 and 112 comprise light emitting diodes. The first and second photoelectric devices 106 and 108 are configured to provide a first visual indication for adjusting the first calibration screw 93 either counterclockwise or clockwise so as to adjust the angular orientation of the rotating laser beam 12 with respect to the X-axis. The third and fourth photoelectric devices 110 and 112 are configured to provide a second visual indication for adjusting the second calibration screw 94 either counterclockwise or clockwise so as to adjust the angular orientation of the rotating laser beam 12 with respect to the Y-axis. Alternatively, the indicator device 100 may include a display device, such as a liquid crystal display. The liquid crystal display may be configured to indicate graphically the proper adjustments to be made to the adjustment device 26 in response to the calibration signal. It will be appreciated by those skilled in the art other photoelectric systems and display devices may be used to indicate visually the adjustments to be made to the adjustment device 26.

In another aspect of the present invention, the processor 90 may be programmed to control the adjustment device 26 directly. In this embodiment, the processor 90 is programmed to control the first and second motors 97 and 98 in response to the calibration signal. The angular orientation of the rotating laser beam 12 with respect to the X and Y axes is therefore controlled automatically. Further, if the rotating device 63 includes a motor, the processor 90 may be programmed so that the laser transmitter 10, and hence, the optical system 17, is checked and calibrated automatically.

Figure 13:
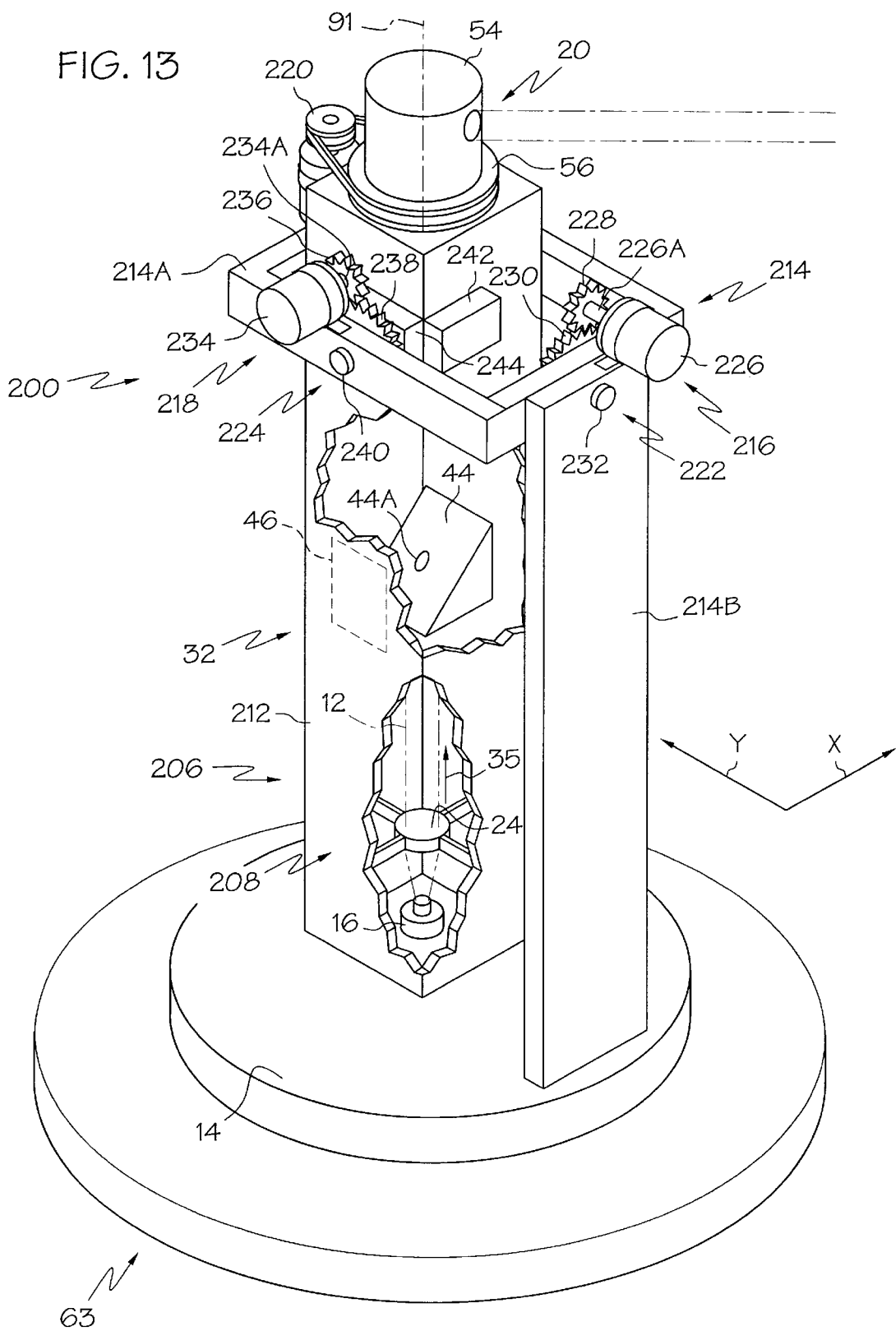
FIG. 13 is perspective view of another laser transmitter according to a further aspect of the present invention.

Referring now to FIG. 13, another laser transmitter 200 according to another embodiment of the present invention is provided with like reference numerals corresponding to like components. The laser transmitter 200 includes a housing 14, the light source 16 and an optical system 206. The optical system 206 comprises an optical assembly 208 and the optical projecting device 20. The optical assembly 208 includes a frame 212, a gimbal mechanism 214, an X-axis leveling device 216, a Y-axis leveling device 218 and the rotating device 63.

The light source 16 is coupled to the frame 212 and generates the beam of laser light 12. The collection lens 24 is coupled to the frame 212 and positioned above the light source 16 so as to collect the laser beam 12 and project it in the first direction 35. The optical projecting device 20 is coupled to the frame 212 and includes a motor and the pentaprism 54 within the spindle 56. The laser beam 12 is rotated along the rotational arc defined by the central rotational axis 91 corresponding to the rotational axis of the pentaprism 54.

The frame 212 is coupled to a first portion 214A of the gimbal mechanism 214 through a Y-axis leveling pivot 224.

The first portion 214A is coupled to a second portion 214B of the gimbal mechanism 214 through an X-axis leveling pivot 222. The X-axis and Y-axis are defined as shown in FIG. 13. However, it will be appreciated by those skilled in the art that the X and Y axes rotate with rotation of the laser transmitter 200. The second portion 214B of the gimbal mechanism 214 is coupled to the housing 14 so that the frame 212 is suspended by the gimbal mechanism 214. Since the frame 212 is suspended from the gimbal mechanism 214, the frame 212 pivots about the X and Y axes via the X and Y axes leveling pivots 222, 224, respectively. The angular orientation of the frame 212 with respect to the X and Y axes, and hence the laser beam 12, is dependent on the orientation of the first portion 214A with respect to the second portion 214B of the gimbal mechanism 214, and the orientation of the frame 212 with respect to the first portion 214A of the gimbal mechanism 214, respectively.

The X-axis leveling device 216 is coupled to the first and second portions 214A, 214B of the gimbal mechanism 214. The X-axis leveling device 216 includes a first motor 226, a first gear 228, a second gear 230, and a first shaft 232. The second gear 230 is coupled to the first portion 214A of the gimbal mechanism 214 using conventional fasteners (not shown) while the first shaft 232 is coupled to the second gear 230 and the second portion 214B through the X-axis leveling pivot 222. The first shaft 232 rotates within the X-axis leveling pivot 222 so that as the second gear 230 rotates, the first portion 214A of the gimbal mechanism 214 rotates with respect to the second portion 214B of the gimbal mechanism 214. The first gear 228 is coupled to a shaft 226A of the first motor 226. The teeth on the first gear 228 correspond to and engage the teeth on the second gear 230 such that as the first motor 226 rotates the first gear 228, the second gear 230 rotates which effectuates rotation of the first portion 214A of the gimbal mechanism 214, and hence the frame 212, with respect to the second portion 214B of the gimbal mechanism 214. Accordingly, the angle of the frame 212 and the laser beam 12 with respect to the X-axis is adjusted.

The Y-axis leveling device 218 is coupled to the first portion 214A of the gimbal mechanism 214 and the frame 212. The Y-axis leveling device 218 includes a second motor 234, a third gear 236, a fourth gear 238, and a second shaft 240. The fourth gear 238 is coupled to the frame 212 through conventional fasteners (not shown) while the second shaft 240 is coupled to the fourth gear 238 and the first portion 214A of the gimbal mechanism 214 through the Y-axis leveling pivot 224. The second shaft 240 rotates within the Y-axis leveling pivot 224 so that as the third gear 236 rotates, the frame 212 rotates with respect to the first portion 214A of the gimbal mechanism 214. The third gear 236 is coupled to a shaft 234A of the motor 234. The teeth on the third gear 236 correspond to and engage the teeth on the fourth gear 238 such that as the second motor 234 rotates the third gear 236, the fourth gear 238 rotates which effectuates rotation of the frame 212. Accordingly, the angle of the frame 212 and the laser beam 12 with respect to the Y-axis is adjusted.

It will be appreciated by those skilled in the art that the X and Y-axis leveling devices 216, 218 may effectuate rotation of the frame 212 through other conventional gearing schemes. It will be further appreciated by those skilled in the art that belt drive systems or direct drive systems may be used to rotate the frame 212 without departing from the scope of the present invention.

The laser transmitter 200 also includes the photodetecting system 32 which is coupled to the frame 212. The photodetecting system 32 includes the reflector 44, the lens 45 (not shown in FIG. 13), the photodetector 46 and the detector circuit 48 (not shown). It will be appreciated by those skilled in the art that the laser transmitter 200 may include the compensator assembly 28 and the focusing mechanism 30 as desired The optical system 206 includes a first level sensor 242 and a second level sensor 244. The first and second level sensors 242 and 244 are coupled to the frame 212. The first level sensor 242 is positioned so that it senses the angular orientation of the frame 212 relative to the X-axis while the second level sensor 244 is positioned so that it senses the angular orientation of the frame 212 relative to the Y-axis. The first and second level sensors 242 and 244 are preferably electrolytic leveling vials. An electrolytic vial oriented as shown in FIG. 13 provides an output representative of the angular orientation of the vial with respect to a substantially horizontal plane. The first and second level sensors therefore provide first and second level signals, respectively, representative of the angular orientation of the frame 212 with respect to the X and Y axes, respectively.

The processor 90 receives the first and second level signals and is programmed to control the X-axis and Y-axis leveling devices 216, 218 so that the first and second level sensors 242, 244 are substantially level. The first and second level sensors 242 and 244 are configured so that the frame 212 is substantially vertical when the first and second level sensors 242 and 244 are substantially level. With the frame 212 substantially vertical, the laser beam 12 is projected upwards substantially vertical such that the rotating laser beam 12 defines a substantially horizontal plane.

The first and second level sensors 242 and 244 may include potentiometers which may be adjusted so as to change the relative magnitudes of the first and second level signals. The potentiometers provide an electrical offset which may be used as necessary to compensate for errors resulting from alignment errors when assembled or calibration errors as described herein. It will be appreciated by those skilled in the art that the processor 90 may be programmed so as to provide the electrical offset for the level sensors 242 and 244. Accordingly, the processor 90 may be programmed to control the potentiometers or to provide the electrical offset in software in response to the calibration signal should it be determined by the processor 90 that the laser transmitter 200 is miscalibrated after performing the calibration check as described above. With the electrical offset in place, the processor 90 will control the leveling devices 216 and 218 until the sensors 242 and 244 are "artificially" level such that the rotating laser beam 12 once again defines a plane which is substantially level or horizontal. It will be appreciated by those skilled in the art that the rotating device 63 may be configured for manual or automatic rotation of the laser transmitter 200.

It will be appreciated by those skilled in the art that other laser transmitters may be used with the present invention so as to check and calibrate the orientation of a rotating laser beam. It will be further appreciated by those skilled in the art that various components described with respect to the laser transmitter 10 and the laser transmitter 200 may be interchanged as desired without departing from the scope of the present invention. The motors described herein for imparting motion to the rotating device 63, the adjustment device 26 and the leveling devices 216, 218 are preferably stepper motors. Feedback from the stepper motors may be transmitted to the processor 90 for further control of the motors as desired. It will be appreciated by those skilled in the art that other motors and control devices may be used for imparting motion to the devices referenced above.

Having described the invention in detail and by reference to preferred embodiments thereof, it will be apparent that modifications and variations are possible without departing from the scope of the invention defined in the appended claims.

What is claimed is:

1. A method for checking and calibrating, if necessary, the orientation of a rotating laser beam, said method comprising the steps of:
projecting said laser beam from a laser source such that it rotates along a rotational arc defined about a central rotational axis and sweeps across a target;
rotating said laser source about a reference axis with said laser source being positioned in a plurality of angular positions about said reference axis;
detecting a reflected laser beam from said target with said laser source in each of said plurality of angular positions;
generating a plurality of reference signals representative of said reflected laser beam from said target with said laser source positioned in each of said plurality of angular positions, each of said plurality of reference signals corresponding to a position of said reflected laser beam on said target; and
generating a calibration signal in response to said plurality of reference signals by comparing a first reference signal corresponding to said position of said reflected laser beam on said target with said laser source positioned in a first angular position with a second reference signal corresponding to said position of said reflected laser beam on said target with said laser source positioned in a second angular position.

2. The method of claim 1, wherein said calibration signal is zero when said position of said reflected laser beam on said target with said laser source positioned in said first angular position is substantially the same as said position of said reflected laser beam on said target with said laser source positioned in said second angular position.

3. The method of claim 1, wherein said plurality of angular positions are offset from each other by approximately 180 degrees.

4. The method of claim 1, wherein each of said plurality of angular positions are offset from adjacent angular positions by approximately 90 degrees.

5. The method of claim 1, wherein each of said plurality of angular positions are offset from adjacent angular positions by approximately 45 degrees.

6. The method of claim 1, further comprising the step of indicating that said rotating laser beam needs to be calibrated based on said calibration signal.

7. The method of claim 1, further comprising the step of indicating a direction in which to adjust a position of said rotating laser beam based on said calibration signal.

8. The method of claim 1, further comprising the step of adjusting a position of said rotating laser beam based on said calibration signal.

9. The method of claim 1, further comprising the step of adjusting the output of a leveling sensor based on said calibration signal.

10. The method of claim 9, wherein said leveling sensor comprises an electrolytic leveling vial.

11. The method of claim 1, wherein said target comprises a first reflective section and a second reflective section with a non-reflective section positioned therebetween.

12. The method of claim 11, wherein said at least one non-reflective section includes a first portion which slopes across said first and second reflective sections.

13. The method of claim 11, wherein said target comprises a first target region in which a first dimension of said first reflective region is greater than a second dimension of said second reflective region, a second target region in which said first dimension decreases proportionally with an increase of said second dimension, and a third target region in which said first dimension is less than said second dimension, wherein said first dimension substantially equals said second dimension substantially in a center of said second target region.

14. The method of claim 13, wherein said step of projecting said laser beam from a laser source such that it rotates along a rotational arc defined about a central rotational axis and sweeps across a target comprises the step of positioning said laser source such that said laser beam sweeps across said second target region of said target.

15. The method of claim 14, wherein said step of generating a calibration signal in response to said plurality of reference signals comprises the step of determining a deviation between said position of said reflected laser beam in said second target region of said target with said laser source positioned in a first angular position and said position of said reflected laser beam in said second target region on said target with said laser source positioned in a second angular position.

16. The method of claim 1, wherein said step of projecting said laser beam from a laser source such that it rotates along a rotational arc defined about a central rotational axis and sweeps across a target comprises the step of adjusting said laser source to a predetermined calibration position, said predetermined calibration position corresponding to a position of said laser source in which a plane defined by said rotating laser beam is substantially horizontal.

17. The method of claim 16, wherein said calibration signal corresponds to a difference between said plane defined by said rotating laser beam and a substantially horizontal plane.

18. A laser transmitter comprising:
a photodetecting system receiving a reflected laser beam and generating a reference signal representative of said reflected laser beam;
an optical system arranged to generate a laser beam from a plurality of angular positions, about a reference axis and to direct said reflected laser beam to said photodetecting system with said optical system in each of said plurality of angular positions, said photodetecting system generating one of a plurality of reference signals corresponding to a position of said reflected laser beam with said optical system in each of said plurality of angular positions, said optical system projecting said laser beam radially along a rotational arc defined about a central rotational axis thereby defining a plane through which said laser beam is projected; and
a processor adapted to receive said plurality of reference signals and programmed to generate a calibration signal in response to said plurality of reference signals by comparing a first reference signal corresponding to said position of said reflected laser beam with said laser optical system positioned in a first annular position with a second reference signal corresponding to said position of said reflected laser beam with said laser optical system positioned in a second angular position.

19. The method of claim 18, wherein said calibration signal is zero when said position of said reflected laser beam on said target with said laser source positioned in said first angular position is substantially the same as said position of said reflected laser beam on said target with said laser source positioned in said second angular position.

20. The laser transmitter of claim 18, wherein said plurality of angular positions are offset from each other by approximately 180 degrees.

21. The laser transmitter of claim 18, wherein each of said plurality of angular positions are offset from adjacent angular positions by approximately 90 degrees.

22. The laser transmitter of claim 18, wherein each of said plurality of angular positions are offset from adjacent angular positions by approximately 45 degrees.

23. The laser transmitter of claim 18, further comprising an indicator device providing an indication that said optical system needs to be calibrated in response to said calibration signal from said processor.

24. The laser transmitter of claim 23, wherein said indicator device includes a photoelectric device providing a visual indication that said optical system needs to be calibrated in response to said calibration signal from said processor.

25. The laser transmitter of claim 24, wherein said photoelectric device comprises an light emitting diode.

26. The laser transmitter of claim 18, wherein said optical system comprises an adjustment device for adjusting an angular orientation of said laser beam with respect to a first axis and with respect to a second axis.

27. The laser transmitter of claim 26, further comprising an indicator device providing an indication for adjusting said adjustment device in response to said calibration signal from said processor.

28. The laser transmitter of claim 27, wherein said indicator device comprises a photoelectric system providing a visual indication for adjusting said adjustment device in response to said calibration signal from said processor.

29. The laser transmitter of claim 28, wherein said photoelectric system comprises a first photoelectric device and a second photoelectric device providing a first visual indication for adjusting said angular orientation of said laser beam with respect to said first axis and a third photoelectric device and a fourth photoelectric device providing a second visual indication for adjusting said angular orientation of said laser beam with respect to said second axis.

30. The laser transmitter of claim 29, wherein each of said first, second, third and fourth photoelectric devices comprises a light emitting diode.

31. The laser transmitter of claim 28, wherein said photoelectric system comprises a display device.

32. The laser transmitter of claim 31, wherein said display system comprises a liquid crystal display.

33. The laser transmitter of claim 26, wherein said adjustment device comprises a first motor for adjusting said angular position of said laser beam with respect to said first axis and a second motor for adjusting said angular position of said laser beam with respect to said second axis.

34. The laser transmitter of claim 33, wherein said processor is further programmed to control said first and second motors in response to said calibration system.

35. The laser transmitter of claim 18, wherein said optical system comprises a first level sensor and a second level sensor, said first level sensor generating a first level signal representative of an angular orientation of said optical system with respect to a first axis and said second level sensor generating a second level signal representative of an angular orientation of said optical system with respect to a second axis, and wherein said processor is further programmed to control said first and second level signals in response to said calibration signal.

36. The laser transmitter of claim 35, wherein said first and second level sensors each comprise an electrolytic leveling vial.

37. The laser transmitter of claim 35, wherein said optical system further comprises a leveling device for adjusting said angular orientation of said optical system with respect to said first axis and with respect to said second axis, and wherein said processor is further programmed to control said leveling device in response to said first and second level signals.

38. The laser transmitter of claim 37, wherein said optical system comprises a rotating device for adjusting said angular position of said optical system with respect to said reference axis, and wherein said processor is further programmed to control said rotating device so as to position said optical system in each of said plurality of angular positions.

39. The laser transmitter of claim 18, wherein said optical system comprises a rotating device for adjusting said angular position of said optical system with respect to said reference axis.

40. The laser transmitter of claim 39, wherein said processor is further programmed to control said rotating device so as to position said optical system in each of said plurality of angular positions.

41. The laser transmitter of claim 40, wherein said optical system comprises an adjustment device for adjusting an angular orientation of said laser beam with respect to a first axis and with respect to a second axis, said adjustment device comprising a first motor for adjusting said angular position of said laser beam with respect to said first axis and a second motor for adjusting said angular position of said laser beam with respect to said second axis, and wherein said processor is further programmed to control said first and second motors in response to said calibration system.

42. A laser transmitter comprising:
    a target;
    a photodetecting system receiving a reflected laser beam and generating a reference signal having a waveform representative of said reflected laser beam;
    an optical system arranged to generate a laser beam from a plurality of angular positions, about a reference axis and to direct said reflected laser beam from said target to said photodetecting system with said optical system in each of said plurality of angular positions, said photodetecting system generating one of a plurality of reference signals corresponding to a position of said reflected laser beam with said optical system in each of said plurality of angular positions, said optical system projecting said laser beam radially along a rotational arc defined about a central rotational axis thereby defining a plane through which said laser beam is projected; and
    a processor adapted to receive said plurality of reference signals and programmed to generate a calibration signal in response to said plurality of reference signals by comparing a first reference signal corresponding to said position of said reflected laser beam on said target with said laser optical system positioned in a first angular position with a second reference signal corresponding to said position of said reflected laser beam on said target with said laser optical system positioned in a second angular position.

43. The method of claim 42, wherein said calibration signal is zero when said position of said reflected laser beam on said target with said laser source positioned in said first angular position is substantially the same as said position of said reflected laser beam on said target with said laser source positioned in said second angular position.

44. The laser transmitting system of claim 42, wherein said plurality of angular positions are offset from each other by approximately 180 degrees.

45. The laser transmitting system of claim 42, wherein each of said plurality of angular positions are offset from adjacent angular positions by approximately 90 degrees.

46. The laser transmitting system of claim 42, wherein each of said plurality of angular positions are offset from adjacent angular positions by approximately 45 degrees.

47. The laser transmitting system of claim 42, further comprising an indicator device providing an indication that said optical system needs to be calibrated in response to said calibration signal from said processor.

48. The laser transmitting system of claim 47, wherein said indicator device includes a photoelectric device providing a visual indication that said optical system needs to be calibrated in response to said calibration signal from said processor.

49. The laser transmitting system of claim 48, wherein said photoelectric device comprises an light emitting diode.

50. The laser transmitting system of claim 42, wherein said optical system comprises an adjustment device for adjusting an angular orientation of said laser beam with respect to a first axis and with respect to a second axis.

51. The laser transmitting system of claim 50, further comprising an indicator device providing an indication for adjusting said adjustment device in response to said calibration signal from said processor.

52. The laser transmitting system of claim 51, wherein said indicator device comprises a photoelectric system providing a visual indication for adjusting said adjustment device in response to said calibration signal from said processor.

53. The laser transmitting system of claim 52, wherein said photoelectric system comprises a first photoelectric device and a second photoelectric device providing a first visual indication for adjusting said angular orientation of said laser beam with respect to said first axis and a third photoelectric device and a fourth photoelectric device providing a second visual indication for adjusting said angular orientation of said laser beam with respect to said second axis.

54. The laser transmitting system of claim 53, wherein each of said first, second, third and fourth photoelectric devices comprises a light emitting diode.

55. The laser transmitting system of claim 52, wherein said photoelectric system comprises a display device.

56. The laser transmitting system of claim 55, wherein said display system comprises a liquid crystal display.

57. The laser transmitting system of claim 50, wherein said adjustment device comprises a first motor for adjusting said angular position of said laser beam with respect to said first axis and a second motor for adjusting said angular position of said laser beam with respect to said second axis.

58. The laser transmitting system of claim 57, wherein said processor is further programmed to control said first and second motors in response to said calibration system.

59. The laser transmitting system of claim 42, wherein said optical system comprises a first level sensor and a second level sensor, said first level sensor generating a first level signal representative of an angular orientation of said optical system with respect to a first axis and said second level sensor generating a second level signal representative of an angular orientation of said optical system with respect to a second axis, and wherein said processor is further programmed to control said first and second level signals in response to said calibration signal.

60. The laser transmitting system of claim 59, wherein said first and second level sensors each comprise an electrolytic leveling vial.

61. The laser transmitting system of claim 59, wherein said optical system further comprises a leveling device for adjusting said angular orientation of said optical system with respect to said first axis and with respect to said second axis, and wherein said processor is further programmed to control said leveling device in response to said first and second level signals.

62. The laser transmitting system of claim 61, wherein said optical system comprises a rotating device for adjusting said angular position of said optical system with respect to said reference axis, and wherein said processor is further programmed to control said rotating device so as to position said optical system in each of said plurality of angular positions.

63. The laser transmitting system of claim 42, wherein said optical system comprises a rotating device for adjusting said angular position of said optical system with respect to said reference axis.

64. The laser transmitting system of claim 63, wherein said processor is further programmed to control said rotating device so as to position said optical system in each of said plurality of angular positions.

65. The laser transmitting system of claim 64, wherein said optical system comprises an adjustment device for adjusting an angular orientation of said laser beam with respect to a first axis and with respect to a second axis, said adjustment device comprising a first motor for adjusting said angular position of said laser beam with respect to said first axis and a second motor for adjusting said angular position of said laser beam with respect to said second axis, and wherein said processor is further programmed to control said first and second motors in response to said calibration system.

66. The laser transmitting system of claim 42, wherein said target comprises a first target region in which a first dimension of said first reflective region is greater than a second dimension of said second reflective region, a second target region in which said first dimension decreases proportionally with an increase of said second dimension, and a third target region in which said first dimension is less than said second dimension, wherein said first dimension substantially equals said second dimension substantially in a center of said second target region.

* * * * *